US008204981B1

United States Patent
Mishra (10) Patent No.: US 8,204,981 B1
(45) Date of Patent: Jun. 19, 2012

(54) METHOD FOR TELECOMMUNICATIONS SERVICE PLANNING

(75) Inventor: Richard Mishra, London (GB)

(73) Assignee: Amdocs Systems Limited, Bath (GB)

( * ) Notice: Subject to any disclaimer, the term of this patent is extended or adjusted under 35 U.S.C. 154(b) by 1026 days.

(21) Appl. No.: 11/851,314

(22) Filed: Sep. 6, 2007

Related U.S. Application Data (60) Provisional application No. 60/915,900, filed on May 3, 2007.

(51) Int. Cl.
   *G06F 15/173* (2006.01)
(52) U.S. Cl. .................................................. 709/224
(58) Field of Classification Search ............... 709/224
   See application file for complete search history.

(56) References Cited

U.S. PATENT DOCUMENTS

| | | | |
|---|---|---|---|
| 6,662,357 B1* | 12/2003 | Bowman-Amuah | 717/120 |
| 2003/0172145 A1* | 9/2003 | Nguyen | 709/223 |
| 2005/0265321 A1* | 12/2005 | Rappaport et al. | 370/352 |

* cited by examiner

*Primary Examiner* — Hussein Elchanti
*Assistant Examiner* — Maceeh Anwari
(74) *Attorney, Agent, or Firm* — Zilka-Kotab, PC (57) ABSTRACT

A method of managing telecommunications services is disclosed which involves storing product data defining a plurality of telecommunications products, each product definition representing a service which may be provided to users of the applications and telecommunications network and comprising one or more service parameters defining characteristics of the service. The networked resource of application servers connected through telecommunications networks is rolled out and enhanced based on the product definition, the market forecast demand for the products and trends derived from actual, historical take-up of the products. Services are provisioned in accordance with the product definitions in the product data. The performance of the network in relation to the provisioned services is measured, and the product data and the product definitions are modified in dependence on the measured performance.

19 Claims, 6 Drawing Sheets

METHOD FOR TELECOMMUNICATIONS SERVICE PLANNING

RELATED APPLICATION(S)

This application claims priority to a provisional application filed May 3, 2007 under application Ser. No. 60/915,900, which is incorporated herein by reference in its entirety for all purposes.

BACKGROUND AND FIELD OF THE INVENTION

The present invention relates to methods of managing and planning telecommunications services provided in a telecommunications network.

SUMMARY

A method of managing applications and telecommunications services is disclosed which involves storing product data defining a plurality of products, each product definition representing a service which may be provided to users of the applications and telecommunications network and comprising one or more service parameters defining characteristics of the service; planning the networked resource in accordance with the product definitions and product volume forecasts, provisioning services in accordance with the product definitions in the product data. The performance of the network in relation to the provisioned services; and the product data or the product definitions in dependence on the measured performance.

BRIEF DESCRIPTION OF THE DRAWINGS

Figure 1:
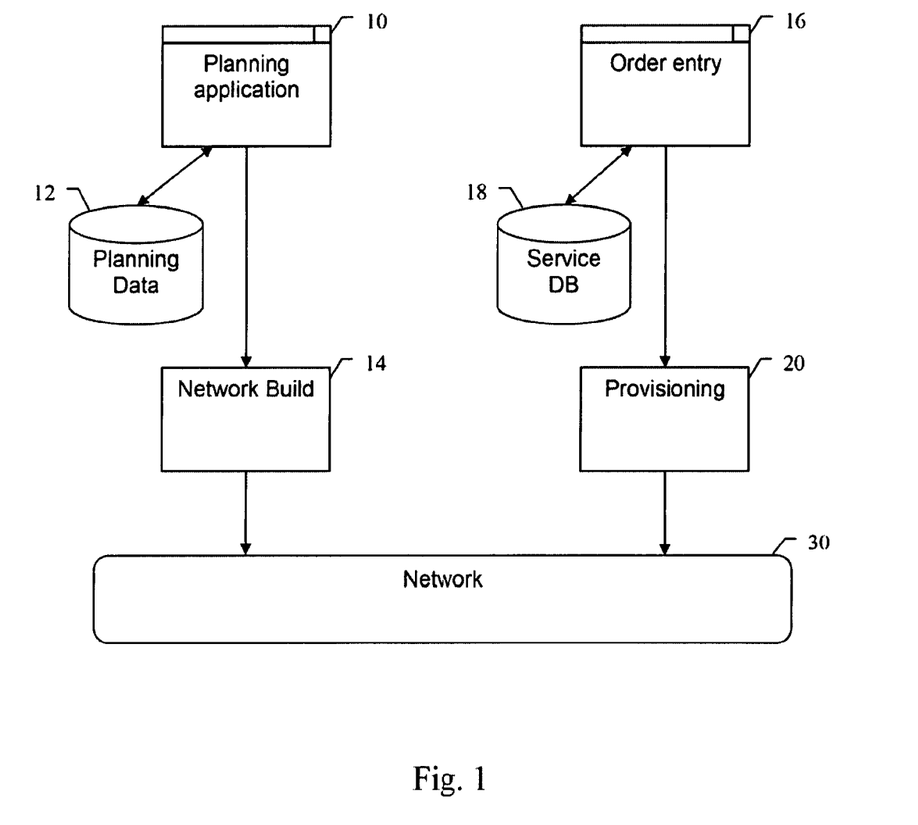
FIG. 1 illustrates a network management method, in accordance with one embodiment.

FIG. 1 illustrates a method for managing a communications network 30.

In the conventional method, network planning relies on planning data 12 which may describe relevant aspects of the network at a high level. A planning application 10 is depicted for use in analyzing the planning data to determine where changes to the network—for example in the form of additional network resources—may be needed. The planning application may be a bespoke application, but of course general purpose software may be used such as reporting tools, spreadsheet software and the like. Some or all of the planning process may also be manual.

Once required changes are identified they are implemented in the network by an implementation process, designated here as "network build" process 14. This may involve both manual and automated activities, for example the ordering and installation of new equipment in the network. The planning data 12 may also be changed to reflect the changes made to the network.

Fulfilment of service orders to customers of the service provider may be provided as a completely separate function of the operator organization. This may use a service database 18 containing details of customers and services. An order entry application 16 (for example under control of a call centre operator) is used to enter new service orders for customers. In the case of an existing customer, the service database 18 may be used to find out which services the given customer already uses, to allow services to be upgraded or discontinued, and new services can be added. In the case of a new customer, the new customer's details can be added to the database, along with information on any new services for the customer. Changes are then made to the network to implement the new services or changes to existing services by a provisioning process 20.

The provisioning process, which may again comprise manual and/or automated activities, may involve reconfiguring equipment in the network. In some cases the delivery and installation of new equipment may also be required. The provisioning process may use same basic information describing relevant features of the network, for example specifying the location of exchanges that may be used to connect users to the network. In the context of the present description, an exchange refers to a switch or wire center corresponding to at least one area for providing service or routing information to users. For example, in various embodiments, an exchange may include, but is not limited to, a central office, a physical building, plant, or any other center used to house network equipment for providing service or routing information to users.

The high-level view of the network used by the planning process may be distinct from the specific information used by the provisioning process, and discrepancies may arise between these sources of information. This can be addressed in part by carrying out a census of the network—manually or using automated discovery techniques—and updating the data used accordingly, but for complex networks this is can be difficult, costly, and unreliable. Also, in this approach, planning may occur to a large extent without knowledge of the services actually being used by customers of the network.

Figure 2:
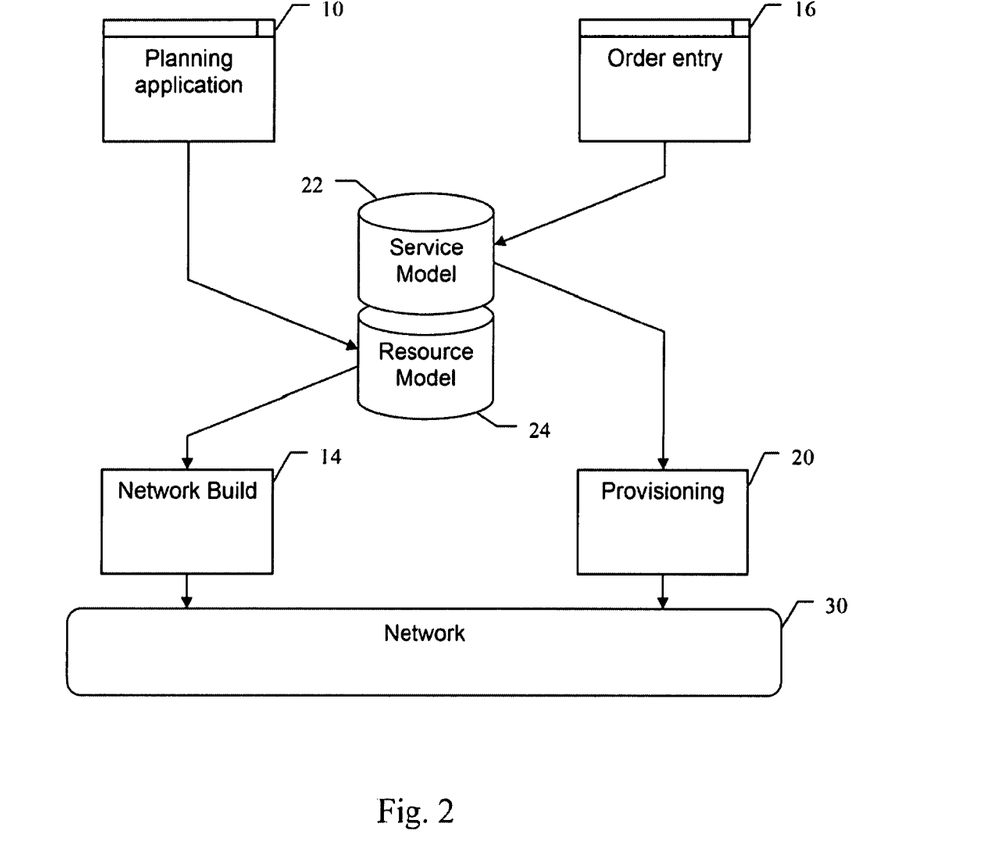
FIG. 2 illustrates a network management method, in accordance with another embodiment.

FIG. 2 illustrates a method using a combined service and resource model, as used in embodiments of the present embodiment, a combined data representation or model of the network is provided which includes two main components: a service model 22 providing details of services provided in the network 30, and a resource model 24 providing details of network resources available in the network.

Planning application 10 uses the resource model 24 to identify what resources are available in the network and to plan changes to or additions of resources. Furthermore, in some embodiments, the planning application makes changes to the model, and the network build process 14 responds to the model changes and implements the changes in the network. In this way, consistency between the model and actual network can be achieved.

Order entry application 16 uses service model 22 to obtain information on existing services and to modify or add services. Again, in various embodiments, the provisioning process is driven not directly by the order entry application 16 but instead by the service model 22—the provisioning process identifies changes to the service model and implements them in the network, for example by configuring devices. This can again provide consistency.

The modification or addition of services may also lead to changes being made to the resource model. For example, bandwidth may be allocated on a link for a particular service, and this bandwidth allocation is recorded in the resource inventory. The modification to the inventory then result in the network being configured accordingly.

The planning application 10 has access to a detailed resource inventory, which may enable effective planning. In addition, the planning application may access the service inventory to analyze the services actually being provided, and can use that information in making planning decisions. JO For example, the planning application may determine that a particular kind of service is popular in a given area, and may then plan additional network resource for that area. The service inventory may also allow historical analysis of data so that service trends can be determined.

Figure 3:
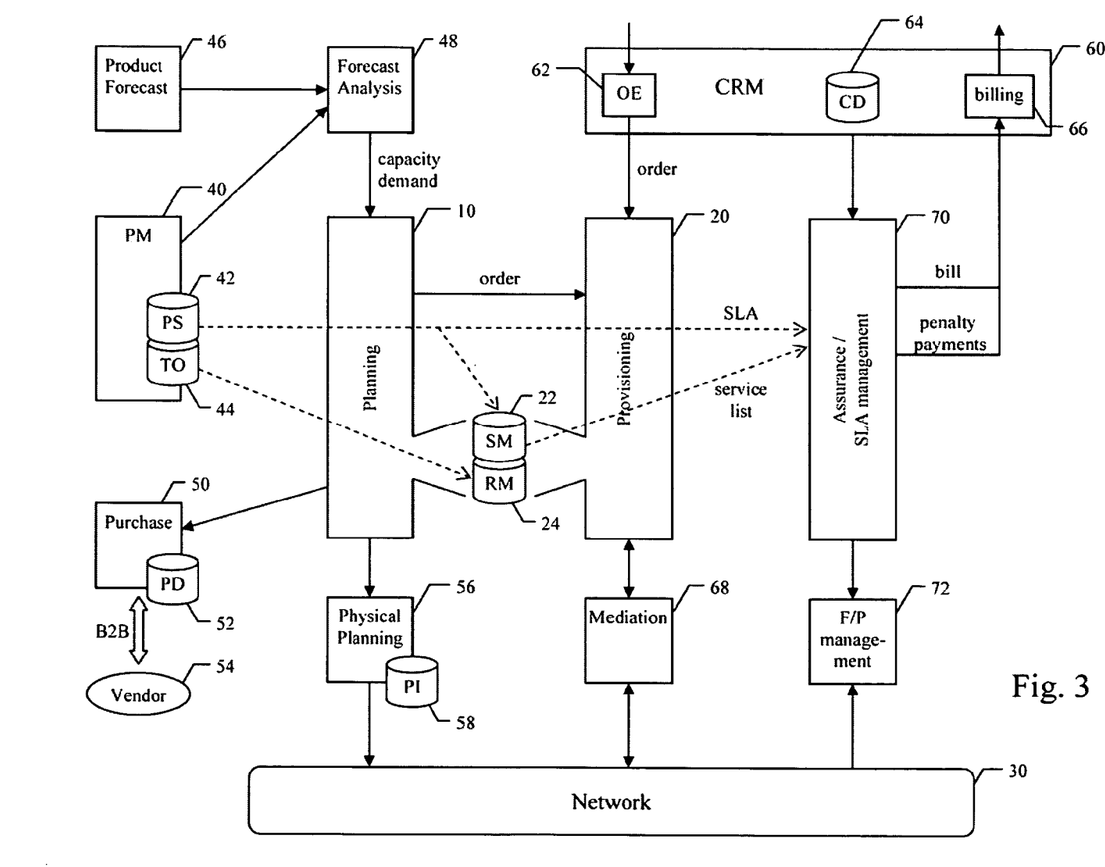
FIG. 3 illustrates the architecture of a network management system.

FIG. 3 illustrates a network management system to enable effective network planning.

As indicated above, the system includes a planning component 10 and a provisioning component 20, which share a service model 22 and resource model 24.

Available applications and telecommunications services (e.g. telecommunications products) are defined in a product model 40. The product model includes two main components:

Product specifications 42, which define services available to users of the applications and telecommunications network, in terms of service parameters such as a bandwidth parameter, an IT (information technology) application, an IT capacity consumption parameter, an availability parameter, a security parameter, a label to identify at least one user, a class of service parameter and a quality of service (QS) parameter, an overbooking ratio parameters and the like.

Technology options 44, which define the available technologies for implementation of services, possibly with service parameter restrictions limiting the circumstances under which a given technology can be used to implement a given product.

For example, a "broadband internet access" product may be specified with service parameters such as upload and download bandwidths and overbooking ratios. Technology options for such a product could, for example, include "DSL" and "cable". Furthermore, the model could specify that the "DSL" technology is only usable for services with download bandwidth up to, say, 8 Mbps, while the "cable" technology option may allow higher speeds.

Separating the definition of services from the technology options available for implementation of those services may allow products to be defined independently of technologies. The technology to use for a given service can then be selected at time of provisioning of a service based on the actual service parameters (e.g. the desired bandwidth), the cost of technologies (where multiple technologies can meet the service requirements), and the availability of the technologies at the relevant network location.

The product model thus define the services available in the telecommunications network, and the resource requirements—in particular data capacity requirements—for a given service can be derived from the product model. The system combines this information with product forecasts 46 in a forecast analysis stage 48 to determine total resource demands (in particular capacity demands) for given products, (e. the capacity and type of technology or other network resources expected to be required for new services over a given time period. This information is supplied to the planning component 10.

The output of the planning component 10 may include:

Requirements for new resources. These may be transmitted to an external purchasing system 50, which may interface directly with a vendor 54 over a business-to-business (B2B) link to acquire the equipment needed. The purchasing system 50 may include a database of purchase-related data 52, for example specifying preferred vendors for given equipment.

Requirements for modifications or additions to the physical network. These are output to a physical planning component 56 which includes a detailed low-level physical inventory 58 of network devices and connections (which may form part of the resource model 24). The physical planning component determines the detailed physical changes needed to implement the planned changes—for example identifying ports to be connected and the like.

Requirements for configuration changes to the network, for example to create a logical circuit of a given bandwidth between existing network devices.

In one embodiment, the latter changes may be provided in the form of internal services. Internal services are similar to end-user services but may not associated with a user or a given product in the product model 40. Instead, an internal service represents the provision of a link or circuit between given locations, having a specified bandwidth. This link may then be used subsequently by end-user services.

Like end-user services, internal services may be provisioned by the provisioning component 20. Thus, the planning component, in response to an identified need, may transmit a service order (for an internal service) to the provisioning component 20. For example, planning component 10 may issue a service order for a logical circuit between given network locations having a specified data capacity. This may result in a circuit being created in the resource model, and optionally, in the configuration of the relevant devices in network 30 to create the circuit.

Configuration of the network 30 to provision services occurs via subsystems collectively designated as mediation component 68. Mediation component 68 may include a configuration manager for configuring devices in the network and a discovery and synchronization tool for checking the configuration of the network against the resource model 24, and flagging any discrepancies and/or correcting discrepancies, either in the model or in the network.

End-user services are provisioned by provisioning component 20 in response to customer orders entered via customer relationship management (CRM) component 60. Specifically, CRM component 60 comprises an order entry component 62 for the entry of product orders. Order entry component 62 may, for example, include an interactive order entry application operated by a customer service operative—e.g. at a call centre—and/or a web order interface for use directly by the customer over the World-Wide Web/Internet. The CRM component 60 uses a customer database 64 to support order entry and also billing functions of a billing component 66.

A quality assurance component 70 monitors the services to users and in particular identifies where the quality of services provided falls short of any level of quality of service (QoS) associated with a product or service.

QoS agreed for a service may be captured in a service level agreement (SLA), and the assurance component 70 may include SLA management functionality. SLAs define acceptable limits on certain performance metrics, such as bandwidth, overbooking ratio, and availability (e.g. uptime/downtime) and the like. These performance metrics may also be referred to as SLA metrics. An SLA may also specify penalty payments or credits which are to be credited to a customer if a service fails to meet agreed quality levels.

The SLA metrics for a given service may be specified in the product catalogue 40, in particular in product specifications 42. In some cases, products in the product model may be defined with parameterizable QoS parameters or SLA metrics, with the actual desired QoS values/SLA metrics selected by the customer when a product order is placed (via order entry component 62). Products may also have a combination of fixed and parameterizable SLA metrics. Once a service instance is created in the service model corresponding to an ordered product, the actual QoS parameters/SLA metrics are then recorded in the service model.

The assurance component 70 can obtain information from the service model on the services used by a user and output billing information to billing component 66. Additionally, the assurance component may obtain SLA parameters for given services from product model 40, such as product specifications 42. Where the SLA specifies penalty payments, the assurance component may also assess the penalty payment criteria and calculate any penalty payments due. This information is then passed to the billing component 66 to adjust the customer's bill accordingly.

Information on network performance and failures is obtained by the assurance component via a further interface to the network 30, referred to herein as the failure/performance management component 72. The information obtained through the F/P management component is used to assess performance of the network in relation to provisioned services against SLAs defined for those services. In particular, F/P management deals with the following:

Network failure—e.g. (traditional) physical loss such as fibre breaks or card failure Network traffic—congestion levels indicated by dropped data packets and delays, which impact performance Network performance—measuring Class of Service parameters (e.g. cell loss, cell delay, jitter)

The architecture described above may allow efficient, integrated service provider lifecycle processes. Product forecast data 46 can be combined with capacity requirements for given products, which can themselves be derived from product specification 42, to produce accurate forecasts of capacity requirements, enabling effective planning by planning component 10. Additionally, the combined service and resource model, together with performance and failure data obtained through F/P management component 72, can be used to determine where network capacity is over-utilized (the network is "running hot") or under-utilized (the network is "running cold"), again allowing improved planning.

A service provider lifecycle process using the above architecture of a network management system described above with respect to FIG. 4.

Figure 4:
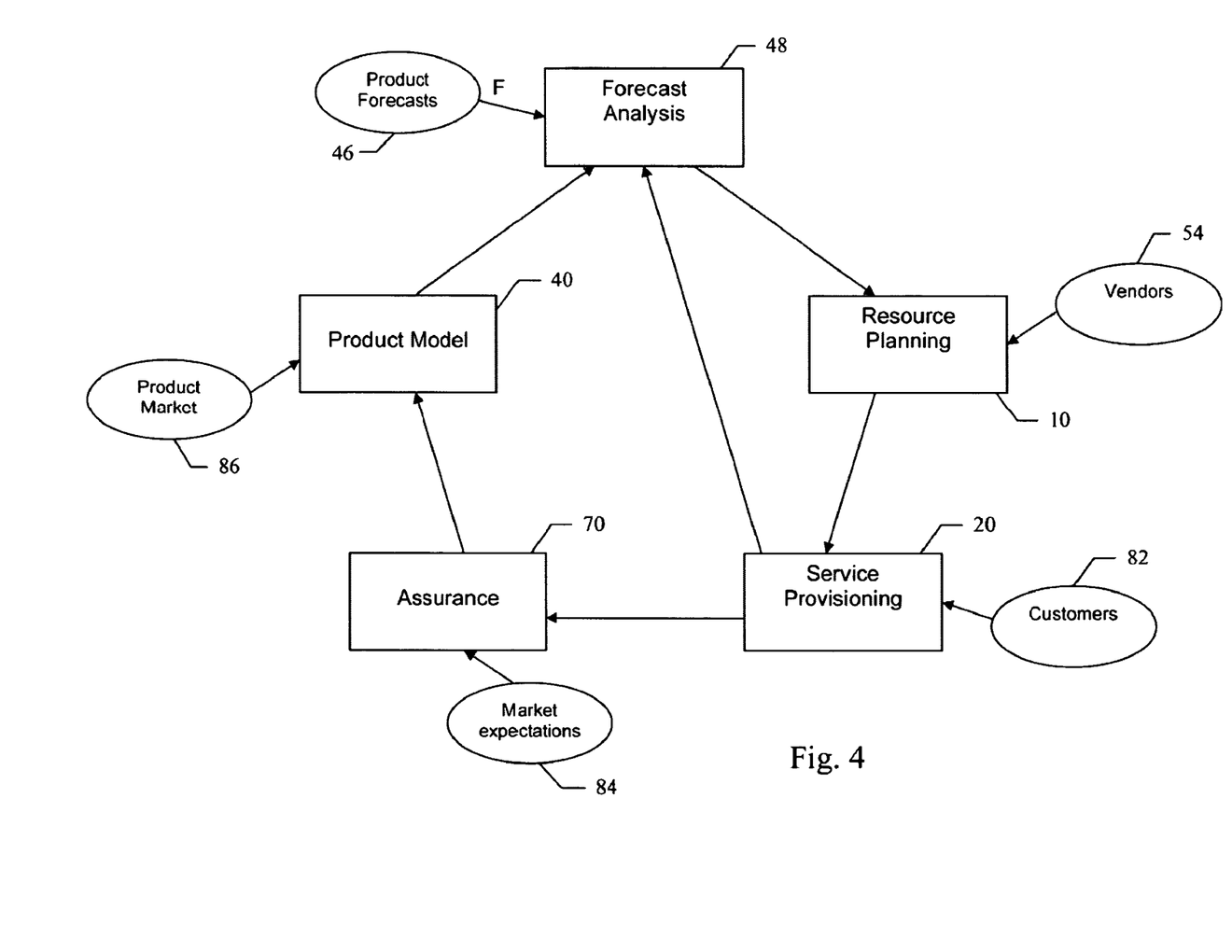
FIG. 4 illustrates planning methods for telecommunications networks and services.

The process involves the modelling of products in product model 40, forecast analysis 48 of projected product uptake, and resource planning 10 based on the resulting forecasts. Actual resources are consumed by the provisioning component 20 to provision services. Assurance component 70 analyzes performance of the network for the provisioned services, and the results of the analysis are used to refine the product model 40.

A product manager may carry out the original definition of telecommunications products based on an analysis of the product market 86. Together, the products make up the product portfolio of a telecommunications service provider. As mentioned above, the product definitions specify service parameters, for example in the form of SLA metrics.

Typically, a product may specify one or more resource requirements, for example, in the form of capacity (or bandwidth) requirements. For example, a given internet access product may have an 8 Mbps bandwidth requirement defined for it.

Product forecasts 46, indicating expected uptake of given products, are multiplied by the capacity requirements for those products in forecast analysis process 48 to produce capacity requirement forecasts. For example, if it is forecast that the above-mentioned 8 Mbps Internet access product is likely to be provided to 500 customers in a given area or at a given exchange, this results in a capacity requirement of 500*8 Mbps=4000 Mbps for that area or exchange (this simple example does not take into account overbooking considerations, which may affect the actual capacity requirement).

The resulting capacity requirements are provided as input to the resource planning process 10. The resource planning process 10 determines what capacity is needed in given areas of the network and what resources are required to meet those capacity requirements. Information from vendors 54 on available network equipment may be used to assist in selecting appropriate equipment based on the capacity requirements.

The resource planning component seeks to ensure that sufficient network resources are available to enable provisioning of the expected volume of services. The network is modified or upgraded based on the plans generated by the planning component. In the example of the 8 Mbs Internet access service, forecast for 500 customers at an exchange location, the planners may use the Service Model 22 and the Resource Model 24 to identify that there are already 50 free ports at the exchange location. The forecasts then require an 450 ports. However, the vendor supplies cards with 48 ports per card, so the planners will plan for 10 cards providing 480 customer access ports to be available at the location, which will meet the forecast and allow for possible additional demand. In addition, the planners will ensure there is enough capacity from the exchange into the network to carry (480+50)*8 Mbps=4240 Mbps of internet quality traffic.

The network resources created as a result can then be used to provision new services in response to service orders from customers 82. The new services are provisioned by provisioning component 20, which records the provisioned services in the service model. In particular, the service model stores a service instance for each product provisioned for a user. The service model can thus provide accurate information on uptake of products.

This information on actual product uptake can be provided as a further input to the forecast analysis component 48, allowing the forecast analysis component to compare forecast data with actual uptake to validate its forecasts or adjust future forecasts accordingly. Furthermore, historical data may be stored in or derived from the service model, on the basis of which service trends can be identified and used to further improve product volume forecasts.

In addition to direct feedback of service data to the forecasting process, service data describing actual provisioned services is analyzed in relation to performance data obtained from the network, to determine the performance of the network in providing those services. This analysis is performed by quality assurance component 70.

In some embodiments, the assurance component 70 obtains the SLA metrics for a given service from the service model or the product definition in the product model, and compares the quality of the service actually provided to the requirements as set out in the SLA. The SLA metrics may, for example, include bandwidth, class-of-service (CoS) or overbooking ratio parameters. Analysis may be based on individual services provided to individual customers (e.g. to detect a performance deviation of a specific service provided to a specific user from its SLA), or may be based on aggregated performance data for a given product or product family.

Performance data for multiple service instances corresponding to a product may, for example, be aggregated across a geographic area (e.g. a city), a subnetwork or a network location (e.g. a given exchange).

As an example, the assurance component may identify an exchange where internet access services with 10:1 overbooking ratios are being provided (as specified in the SLA), but the actual overbooking ratio achieved at that exchange is only 20:1, meaning that network resources at that exchange are over-utilized.

The analysis performed by assurance component 70 may use data on market expectations 84 when analyzing the network performance. For example, the assurance component may measure congestion over a given period at a given exchange, and market expectation data 84 may specify an acceptable level of congestion based, for example, on the quality of video that is acceptable to mobile phone users. Action may then only be taken if the actual congestion exceeds the threshold set in the market expectation data.

The analysis performed by assurance component 70 involves interpreting network traffic conditions as captured by the performance measures, to determine impact on customer experience. The analysis is dependent on various factors, including the location of any traffic problems, the type of equipment involved, the type of the affected traffic and the like. For example, the same traffic conditions hitting two different edge devices from different vendors may result in differing customer experience. This is because different vendors build in different kinds of mechanisms to compensate for different traffic conditions. Furthermore, consumers are more susceptible to certain kinds of performance degradation depending on the media that is being transmitted; for example, audio may be intolerant to delay and data loss, as compared to video.

In some embodiments of the process, the results of the performance analysis performed by the assurance component 70 may be passed directly to the resource planning component 10 to influence resource planning (e.g. to provide additional resources in places where the network is "running hot", i.e. where the network is over-utilized).

In other embodiments, the results of the performance analysis are fed back to the product definition process to enable revision of the product portfolio represented in the product model 40. For example, the product manager may choose to modify the definition of existing products based on the results of the analysis to ensure that the product specifies sufficient capacity to meet the quality requirements. The product manager may choose to remove or replace products, or to add new products. The aim is to manage the product portfolio to enable efficient utilization of network resources. In particular, by re-specifying the product in response to the results of the performance analysis (which reflects traffic conditions), the planning process is then supplied with the modified product specification, causing planning to deploy more capacity (in the example where network performance data indicated over-utilization of network resources). This can result in a controlled solution with an explicit and audited chain of cause and effect.

As a further example, analysis by the assurance component 70 may indicate that, for the 8 Mbps internet access service, on average only 6 Mbps bandwidth is being achieved (the network is running hot). The product definition may then be revised to reflect this, in particular to reduce the access speed for the product. Alternatively it may be determined that excess bandwidth is available (the network is running cold), making it possible to increase the bandwidth for the internet access product at no additional cost, thus resulting in a more attractive product for the customer.

Where products are oversubscribed, thereby placing a strain on network capacity, additional capacity may be provided, or alternative or lower-capacity products may be offered instead. On the other hand, spare capacity in the network can be detected from the utilization data available from the service and resource models, and made available in the form of new or modified products, so as to maximize utilization of the available resources and hence the revenue generated from those resources.

In some embodiments of the process, changes to the product definition may be applied using service fulfilment functions to some or all of the existing services in the networked resource that were implemented using the original product definition. For example previous specifications of quality, such as bandwidth can be decreased or increased if there is sufficient capacity in the networked resource, using a policy change as a set of fulfilment commands across the networked resource. In this way, changes to a product definition can also be applied retrospectively to services implemented using the product definition.

The above process thus provides a full cycle of product, network planning, service fulfilment and service assurance in which the design of the product portfolio made available to customers can be driven directly from the actual services provided in the network (as well as from the network resources available), rather than from abstract, ad hoc planning data. This close, cyclic integration of product planning, network (resource) planning, service provisioning and service assurance can result in a more market-driven lifecycle for the service provider in which the product offerings are based on the desired customer experience, network capabilities are deployed based on market demand for products and vendor offerings, services are deployed based on customer orders and customer experience is monitored by service assurance and fed back to influence the product offerings. This can also allow the service provider to react more effectively to changes both in user's service requirements and in the capabilities of the network. Also, by way of the various information feedback paths integrated software systems, the service provider lifecycle described can assist in maintaining high data quality throughout the service provider business processes lifecycle: the product catalogue and the service and resource models used by planning, fulfilment and assurance. For example, by relating network performance data to product definitions, provisioned services and network resource information, discrepancies between the actual and desired state of the network (e.g. in terms of resource availability or service performance) can be detected and rectified more easily.

The networked resource lifecycle management system described above may be implemented in the form of one or more software applications executing on a single computer or on multiple connected computers. For example, the planning, provisioning and assurance components mentioned above may each be provided in the form of separate interconnected servers. The data used, such as the product model, service model, resource model and the like may be provided in a single central database accessed by all parts of the system (for example as different portions or layers of a unified data model) or may be stored in separate databases, possibly at separate computers/locations.

EXAMPLE

A detailed example of an implementation of the above-described management and planning process will now be described.

Figure 5:
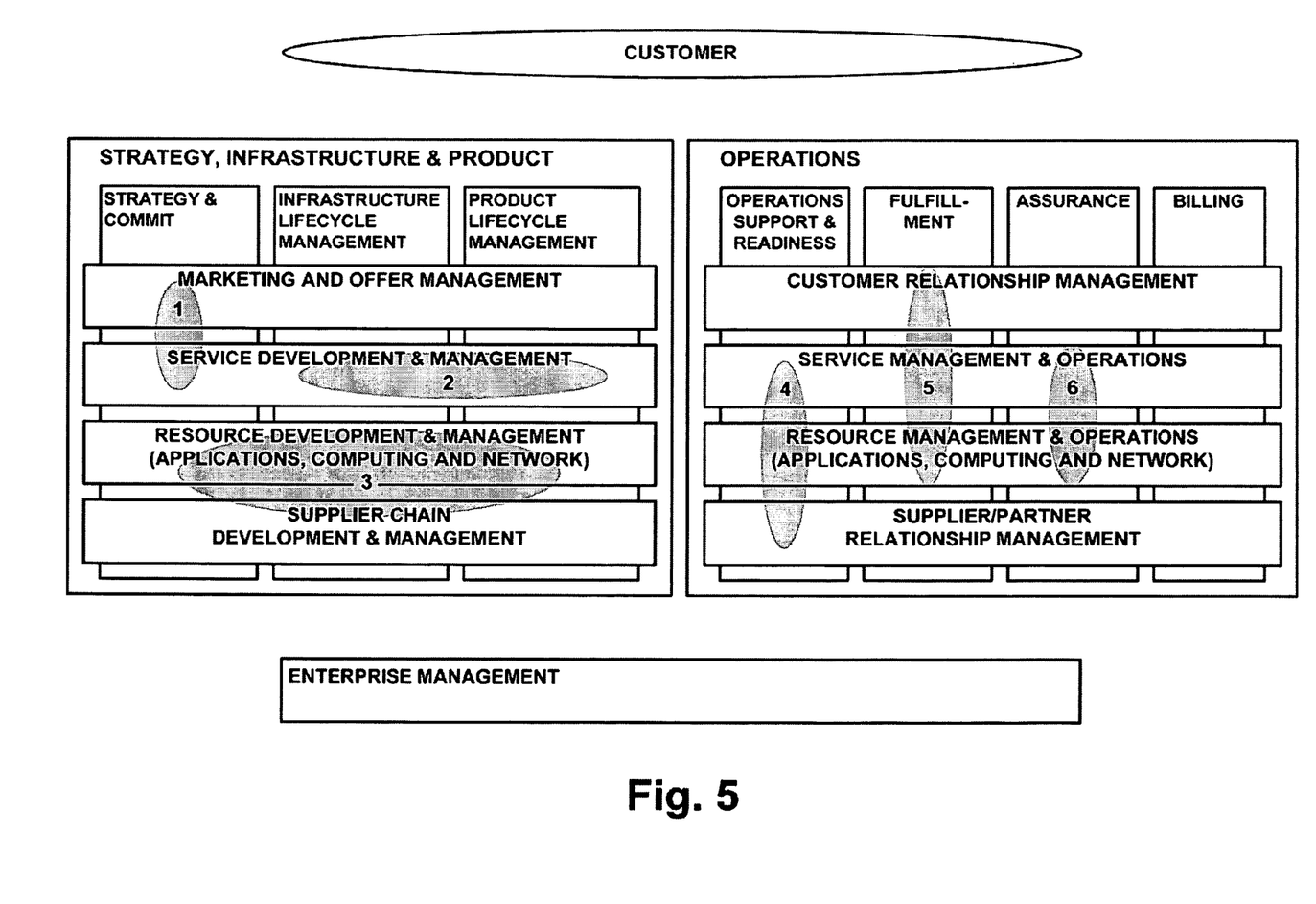
FIG. 5 illustrates the Enhanced Telecommunications Operational Map (eTOM)

The example is given in relation to an Enhanced Telecommunications Operational Map (eTOM). FIG. 5 illustrates the TMF (TeleManagement Forum) eTOM process map (Level 1 processes) overlaid with Key Steps.

The eTOM model has multiple levels of abstraction, covering three main areas:

Operations—This area includes customer relationship management, service management, resource management, and supplier/partner relationship management.

Strategy, Infrastructure & Product—This area includes processes that support the creation of strategies for marketing, development of new services, resource development & management, and supply chain development & management.

Enterprise Management—This area includes those basic business processes that are required to run and manage an enterprise. Enterprise Management includes process areas such as human resource management, financial asset management, and disaster recovery management Of these major areas, certain processes within both 'Strategy, Infrastructure & Product' and 'Operations' form the main steps in operating an efficient 'market-driven communications service provider'. These areas are labelled in the diagram and form a repeating lifecycle, which means that they apply to existing CSPs (customer service providers) as well as new businesses. The Level 2 eTOM processes are referenced in the following sections (see TMF document eTOM Addendum D: Process Decompositions and Descriptions, Rel. 6.0, GB921D).

Main Process Steps for a Market Driven Service Provider

There are hundreds of processes across eTOM, so it is challenging for a CSP to know what are the basic, essential steps required to ensure efficient operation and high quality customer experience. Some of these key steps are described here.

Despite the fact that these processes cover a broad range of CSP business activities, they are directed solely on operating the networked resource efficiently and delivering high quality customer experience from the networked resource. There are other areas of the business such as product marketing, managing the SP enterprise itself, CRM and billing that are necessary for a good business, but these process and methods apply to all business not just CSPs. These pure business processes are not addressed here.

Step 1: Market Intelligence

Understand the market, the fit of products and services to the market and with each other across the portfolio. For example, this step will ensure that the portfolio does not develop an unnecessary and confusing range of similar products and does not contain internally competing products and services. This function may not always be supported by systems automation and may be dependent on expert judgment.

Nonetheless it can be an important business function. A large and over-complicated product portfolio indicates a failure in this business area and can make changing any of the management systems much harder. For example with a portfolio of many thousands of products, it can be extremely time-consuming to establish the dependency of the products to any on the systems. As a result, it can be much harder to plan the migration away from any legacy system. It can also be hard to establish if the products are delivering value to the CSP and operating with very many similar products can make operational streamlining very difficult.

eTOM Level 2 Processes:

Market Strategy & Policy (from Marketing and Offer Management)

Product & Offer Portfolio Planning (from Marketing and Offer Management)

Service Strategy & Planning (from Service Development & Management)

Essential Value to the Market Driven CSP

The need for this step is obvious. There is no commercial value in supplying products where there is insufficient demand, because the product is not liked or the market is already saturated. The step helps determine the type of product to be offered, but the critical data contribution is to provide product volume forecasts that feed into capacity management. This is used to improve on predictions made purely by extrapolating utilization trends. Although pure trending is generally reliable, it cannot account for factors such as changes in economic conditions, new products, markets and sources of competition and simple factors such as advertising drives and pricing changes.

Step 2: Specify Products and Services

Develop, specify and maintain the product and service in the portfolio to be offered into the market place. Ensure that the process engages all the providers of facilities required to deliver the services, such as internal functions, supplier relationships and networked resource.

Product specification feeds Strategic Planning to determine what network capability to deploy to support the product and forecast product volumes. Changes in the product specification feed Tactical Planning to ensure that the changes are reflected in the amount of network that is deployed. Also changes in the specification of some products may be directly implemented on existing services in the network through policy changes. Finally product specification provides data to drive Fulfilment; it determines the components and the service values that Fulfilment needs to deliver. eTOM Level 2 Processes:

Service Capability Delivery (from Service Development & Management)

Service Development & Retirement (from Service Development & Management)

Essential Value to the Market Driven CSP

This is another obvious step, but rarely fully exploited. The value here is to properly model products not just so that the portfolio becomes more manageable, but to use the data to directly drive other business functions. This cuts out informal and manual interworking between organizations such as resource planning, fulfillment, assurance and billing. The result is a much faster and cost efficient route to market for new products, but higher data integrity through the various interactions. This is the first step in a data integrity cycle. The product model directly drives planning and fulfillment.

Step 3: Strategic Planning

Ensure that networked resource of the correct technology and necessary volumes are deployed to meet forecast demand for services. Ensure that these resources can deliver the correct customer experience and hand-over to Operations for ongoing management. This covers strategic deployment within the lifecycle of the networked resource as well as deployment of new technologies. Supply chain integration with vendors is part of this step to ensure efficient interaction with vendors, including outsourced network engineering.

eTOM Level 2 Processes:

Resource Strategy & Planning (from Resource Development & Management)

Resource Capability Delivery (from Resource Development & Management)

Resource Development & Retirement (from Resource Development & Management)

Supply Chain Capability Delivery (from Supply Chain Development & Management)

Essential Value to the Market Driven CSP

This step is well understood in Tier1 CSPs and has a number of critical consequences.

Firstly it constrains resource deployment to an architecture designed for the most effective resource investment, often determined by the network technology being deployed. For example SONET/SDH will exploit ring topologies, whereas Ethernet makes use of tree structures. This not only maximizes the achievable utilization levels but also optimises the network for resilience, providing a topology where restoration capacity can be efficiently deployed. The Strategic view also manages the interdependencies between different technology layers in the network and ensures capacity to support dependent layers. Although planning can operate on individual layers, there is no guarantee this will produce an optimum overall network.

Secondly the architecture ensures the network supplies proper geographic coverage and volumes, tuned to regional forecast demand for products and the product specification. Step 1 and Step 2 combine to feed step 3.

Thirdly it guides service provisioning so that functions such as route finding properly exploit the deployed network architecture.

The result is a manageable networked resource that can be grown organically to meet demand, has high levels of utilisation and resilience and does not require regular and expensive restructuring.

Step 4: Tactical Planning

Ensure sufficient capacity is available for service provisioning and provide the network capacity required for individual service instances. The second point applies mainly to the network engineering in the Access network, usually required to provide high capacity premium services from the edge device to the customer premises. This functional area works with supplier/partner management to deploy capacity into the network using efficient processes directly with suppliers and partners.

The process also feeds back to Strategic Planning to update Strategic Plans with actual utilization rates that can be used to improve the forecast process. It also needs to ensure that the product/service specification is correct. If the specification allows for too much capacity for each service instance, then the network will be underutilized and costs will be higher than necessary. Such failure conditions may feed back to the product/service specification step so that the specification can be modified. This aspect of the process complements the assurance function, discussed below.

eTOM Level 2 Processes

Support & Readiness (from Resource Management & Operations)

Support & Readiness (from Supplier/Partner Relationship Management)

Essential Value to the Market Driven CSP

This is the most important of the data integrity steps, though it has other significant values.

Tactical planning provides a rigorous process for churning the network at physical, technology and IT layers. It ensures that the churn is in accordance with Strategic Planning and is against an accurate inventory of the networked resource. It also ensures loss-free communication with other business functions that require inventory data.

This step captures the inventory data for the resource at source and ensures that data is available for subsequent business functions, particularly network build, provisioning and assurance. It also ensures that the network is built as specified by the planning function and where build cannot follow plans often due to challenges from the build process with vendors, it ensures that any changes are captured in the planning inventory data. This inventory data then feeds the service provisioning systems, where accurate data is critical to automated flow-through provisioning.

Step 5: Fulfilment

This step requires flow-through automation for residential services and may need to support fall-out to manual processes where the automation fails. Fulfilment processes are driven from data in the Product/Service Catalogue. The step may also be supported by manual activities for high value and custom services. Integration with EMS may be necessary for Activation/Configuration. Integration with product and service specification is preferred. The step will hand off to Assurance and Billing.

eTOM Level 2 Processes:

These processes are from the Fulfilment vertical in Operations.

Order Handling

Service Configuration & Activation

Resource Provisioning

Essential Value to the Market Driven CSP

The value of this function is obvious, but is often implemented in an informal and disjointed manner. A particular problem with traditional implementations is the silo or stove pipe approach, where separate processes and systems are used to fulfill services that may be very similar from the customer perspective. Within the Market Driven CSP, Fulfillment takes resource inventory from planning and utilizes the resource for customer and internal network services. It uses the product specification to determine resource type and capacity that is consumed per service instance. It makes the resultant service and resource inventory available for further Fulfillment, Planning and Assurance. It feeds actual utilization information back to Planning, so closing the loop started by applying product volume forecasts. Formal process hand-offs to assurance and billing are also supported to maintain data access and integrity.

Step 6: Service Assurance and SLA Management

Ensure that the service is performing as specified in the Product/Service specification and the Service Level Agreement (SLA). This has two components.

Firstly there is the management of the service instance for the customer. This will include trouble reporting and progression, repair and restoration processes that make use of Tactical Planning and Fulfilment functions as well as interfaces to billing, where Service Level Guarantees have been broken. This may require data collection from the network for fault and performance. The data collection processes can also be used for Billing Mediation, which is required for usage billing and is interfaced directly to the billing function.

This group of processes forms a smaller lifecycle that manages individual service instances for the customer. It also includes service modification and cease.

Secondly performance management is used to ensure that the original product/service specification is correct. If the specification does not assign sufficient capacity for each service instance, then the service will not be able to meet the SLA. Performance management will identify this as traffic congestion resulting in service quality failures. Such failure conditions may feed back to the product/service specification so that the specification can be modified. Performance Management will also identify where the traffic levels underutilize the networked resource. This indicates that the product/service specification assigns too much capacity for each service instance, resulting in too much network being deployed and higher cost to the CSP. This may also feed the service specification. This feedback closes the loop.

Note that many service quality issues can often only be handled by Resource Management functions, which track traffic quality in the networked resource.

eTOM Level 2 processes:

These Level 2 processes are from the Assurance vertical in Operations.

Problem Handling
    Service Quality Management
    Customer QoS/SLA Management
    Resource Trouble Management
    Resource Performance Management
    Resource Data Collection & Processing Essential Value to the Market Driven CSP Assurance has a number of critical roles and methods to ensure highest levels of customer experience within the agreed SLA.

Firstly there is the management of the service instance for the customer. This will include trouble reporting and progression, repair and restoration processes that make use of Tactical Planning and Fulfillment functions as well as interfaces to Billing for penalty payments where Service Level Guarantees have been broken. This requires data collection from the network for fault and performance. The data collection processes can also be used for Billing Mediation, which is required for usage billing and is interfaced directly to the billing function.

Secondly performance management is used to ensure that the original product/service specification is correct. If the specification does not assign sufficient capacity for each service instance, then the service will not be able to meet the SLA. Performance management will identify this as traffic congestion resulting in service quality failures. Such failure conditions need to feedback to the product/service specification so that the specification can be modified. Performance Management will also identify where the traffic levels underutilize the networked resource. This indicates that the product/service specification assigns too much capacity for each service instance, resulting in too much network being deployed and higher cost to the CSP. This also needs to feed the service specification. This feedback closes the lifecycle loop for the Market Driven CSP.

Market Driven Service Provider

The decision to select particular processes and a particular sequence is determined by the need to create and distribute data in a way that maximizes data quality.

Data Quality

A very strong driver for the selection of processes and applications is the need to maintain high data quality. There may be a continuity of systems within each process and also a continuity of systems between each process so that data can be transferred and maintained accurately and consistently. This informs much of the system solution design implied in this document. This determines the minimum sufficient number of systems that ensure that manual and paper-based processes are removed from the operations of the CSP and that data is captured at the point where it is generated and transferred electronically between systems.

High quality customer experience can be a direct result of high quality data within the enterprise. For example, it can ensure that flow-through automation has very low rates of fall-out to manual and can ensure that customer service information is available when the customer makes an enquiry.

Figure 6:
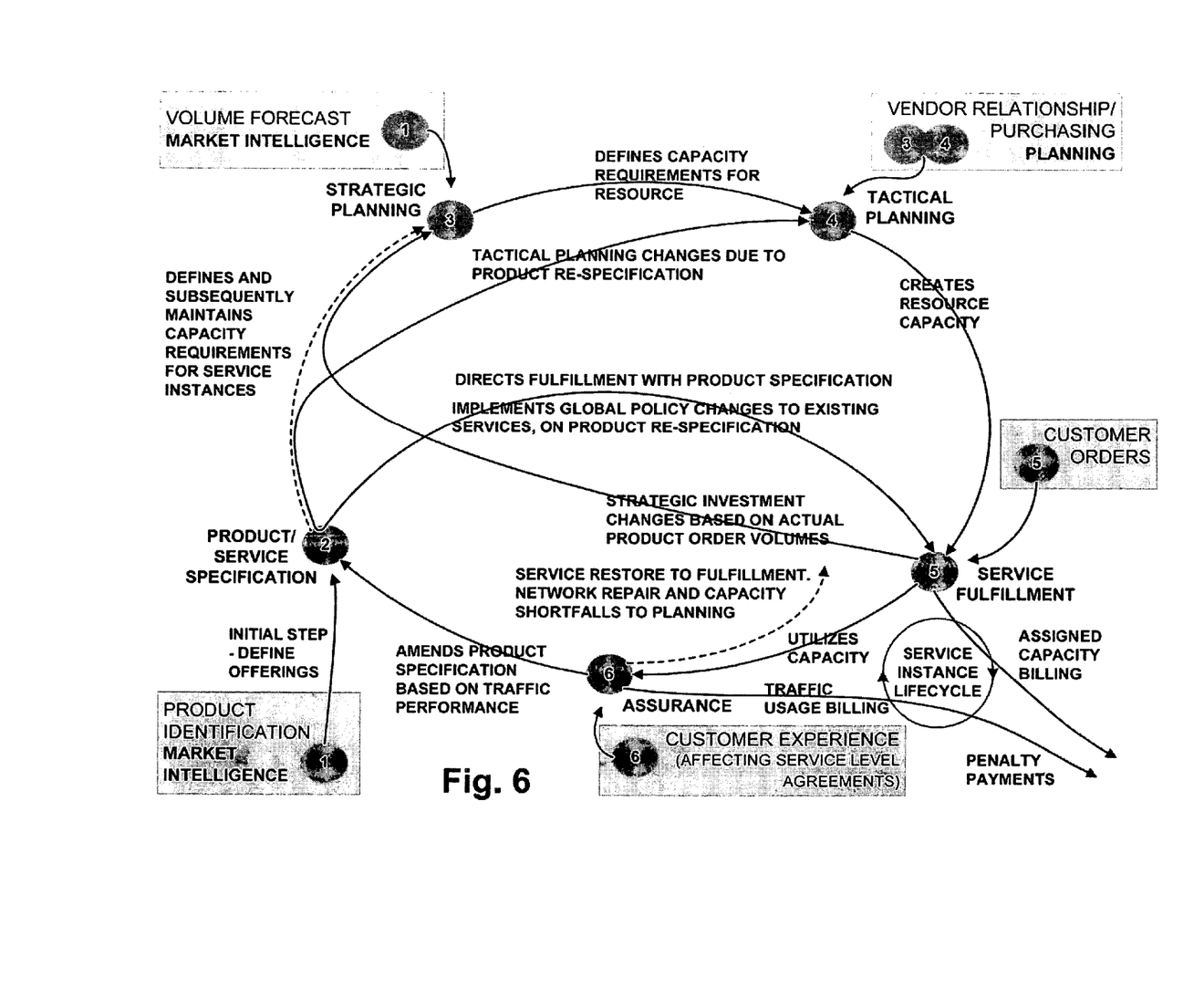
FIG. 6 illustrates a detailed example of a product and network lifecycle process.

FIG. 6 illustrates the concept of the Market Driven Service Provider using the key process steps identified above. In the diagram, these steps are put together into a single lifecycle picture for the CSP. As such, this provides a more detailed example of the implementation of the process previously described and illustrated in FIG. 4.

The diagram shows external market forces feeding into and driving the overall lifecycle of the CSP. In most cases the processes are involved in both capturing the input as well as the processing internal to the CSP. The Market intelligence step is external to operations and Billing is also seen as external to Strategy and Operations. The diagram further shows a service instance lifecycle.

Extracting Business Intelligence

With integrated systems and high data quality is the opportunity to extract Business Intelligence from the systems, shaped to give valuable insight into the CSP internal workings, its customers and the products/services that it offers.

This can enable good Strategic and Tactical Planning, as well as drive other Business Intelligence functions.

Such Business Intelligence can not only enable the services from different CSPs to be compared, it can also enable the CSPs to be compared directly and can identify operational inefficiencies.

It will be understood that the present example has been described above purely by way of example, and modification of detail can be made within the scope of the invention.

The invention claimed is:

1. A method of managing applications and telecommunications services in an applications and telecommunications network, comprising:

storing, utilizing a computer, product data defining a plurality of products, each product definition representing a service which may be provided to users of an applications and telecommunications network and comprising one or more service parameters defining characteristics of the service;

provisioning services in accordance with the product definitions in the product data;

measuring performance of the network in relation to the provisioned services;

modifying the product data in dependence on the measured performance;

receiving product forecast data relating to a given product, the given product including a networked resource capacity requirement;

calculating a capacity requirement forecast from the product forecast data and the networked resource capacity requirement, the calculating including multiplying the product forecast data and the networked resource capacity requirement;

generating planning data in dependence on the capacity requirement forecast by determining a capacity requirement that is needed in particular areas of the applications and telecommunications network and what resources are required to meet the capacity requirement, such that equipment information is received from vendors on available network equipment and is further used in selecting appropriate equipment based on the capacity requirement, the planning data defining changes to a networked resource;

storing a model of the applications and telecommunications network, and modifying the network model in dependence on the planning data;

recording each of the provisioned services in the network model, the network model storing a service instance for each service provisioned and providing accurate information on uptake of products, which is fed back for use in connection with the calculation of the capacity requirement forecast;

receiving a product order specifying one of the products and one or more service parameters, and creating at least one service instance in the network model based on a product definition of the specified product and the specified service parameters; and retrieving service data relating to the provisioned services from the network model, and analyzing the measured network performance by reference to the retrieved service data.

2. A method according to claim 1, wherein modifying the product data comprises adding, deleting or modifying one or more product definitions.

3. A method according to claim 1, wherein modifying the product data comprises adjusting one or more of the service parameters of at least one of the product definitions.

4. A method according to claim 1, wherein one or more service parameters of a given product definition relate to one or more configuration settings for configuring one or more network devices to provide a corresponding service.

5. A method according to claim 1, wherein service parameters for a given product comprise one or more of: a bandwidth parameter, an IT application, an IT capacity consumption parameter, an overbooking ratio parameter, an availability parameter, a security parameter, a label to identify at least one of the users, a class of service parameter and a quality of service parameter.

6. A method according to claim 1, wherein service parameters for a given product specify expected performance characteristics applicable to the given product.

7. A method according to claim 1, comprising storing data defining expected performance characteristics applicable to services, measuring the performance of the network in relation to the services, and comparing the measured performance to the expected performance characteristics.

8. The method according to claim 7, wherein the data defining expected performance characteristics comprises a service level agreement.

9. The method according to claim 1, further comprising implementing the changes defined in the planning data in the networked resource.

10. The method according to claim 1, comprising provisioning one or more internal services to provide additional capacity in dependence on the planning data.

11. The method according to claim 1, comprising implementing changes made to the network model in the applications and telecommunications network.

12. The method according to claim 1, wherein a modification to at least one of the product definitions corresponds to at least one modification to a related service.

13. The method according to claim 1, wherein the information on product uptake is provided as an input to a forecast analysis and allows comparing forecast data with the product uptake to validate forecasts or adjust future forecasts accordingly.

14. The method according to claim 1, wherein a plurality of technology options define a plurality of available technologies for implementation of the services, and a plurality of service parameter restrictions limit circumstances under which a technology of the plurality of available technologies can be used to implement the given product.

15. The method according to claim 1, further comprising transmitting requirements for new resources to an external purchasing system that interfaces directly with a vendor over a business-to-business link and includes a database of purchase-related data.

16. A method of generating planning data relating to an applications and telecommunications network, comprising:

defining, utilizing a computer, at least one product, the product definition specifying one or more technical characteristics of a service to be provided in a network, including a resource requirement;

receiving a product forecast for the product, the product including a networked resource capacity requirement;

calculating a resource requirement forecast from the product forecast and the networked resource capacity requirement, the calculating including multiplying the product forecast and the networked resource capacity requirement;

generating planning data in dependence on the resource requirement forecast by determining a capacity requirement that is needed in particular areas of the applications and telecommunications network and what resources are required to meet the capacity requirement, such that equipment information is received from vendors on available network equipment and is further used in selecting appropriate equipment based on the capacity requirement;

storing a model of the applications and telecommunications network, and modifying the network model in dependence on the planning data;

recording the service in the network model, the network model storing a service instance for the service and providing accurate information on uptake of the product, which is fed back for use in connection with the calculation of the resource requirement forecast:

receiving a product order specifying a product and one or more service parameters, and creating at least one service instance in the network model based on a product definition of the specified product and the specified service parameters; and retrieving service data relating to the provisioned services from the network model, and analyzing the measured network performance by reference to the retrieved service data.

17. The method according to claim 16, further comprising modifying the network based on the planning data.

18. A computer program embodied on a non-transitory computer readable medium for generating planning data relating to an applications and telecommunications network, comprising:

computer code for defining at least one product, the product definition specifying one or more technical characteristics of a service to be provided in a network, including a resource requirement;

computer code for receiving a product forecast for the product, the product including a networked resource capacity requirement;

computer code for calculating a resource requirement forecast from the product forecast and the networked resource capacity requirement, the calculating including multiplying the product forecast and the networked resource capacity requirement;

computer code for generating planning data in dependence on the resource requirement forecast by determining a capacity requirement that is needed in particular areas of the applications and telecommunications network and what resources are required to meet the capacity requirement, such that equipment information is received from vendors on available network equipment and is further used in selecting appropriate equipment based on the capacity requirement;

computer code for storing a model of the applications and telecommunications network, and modifying the network model in dependence on the planning data;

computer code for recording the service in the network model, the network model storing a service instance for the service and providing accurate information on uptake of products, which is fed back for use in connection with the calculation of the resource requirement forecast;

computer code for receiving a product order specifying a product and one or more service parameters, and creating at least one service instance in the network model based on a product definition of the specified product and the specified service parameters; and computer code for retrieving service data relating to the provisioned services from the network model, and analyzing the measured network performance by reference to the retrieved service data.

19. A system for generating planning data relating to an applications and telecommunications network, comprising:

a processor and memory for performing the steps of:

defining, utilizing a computer, at least one product, the product definition specifying one or more technical characteristics of a service to be provided in a network, including a resource requirement;

receiving a product forecast for the product, the product including a networked resource capacity requirement;

calculating a resource requirement forecast utilizing the product forecast and the networked resource capacity requirement, the calculating including multiplying the product forecast and the networked resource capacity requirement;

generating planning data in dependence on the resource requirement forecast by determining a capacity requirement that is needed in particular areas of the applications and telecommunications network and what resources are required to meet the capacity requirement, such that equipment information is received from vendors on available network equipment and is further used in selecting appropriate equipment based on the capacity requirement;

storing a model of the applications and telecommunications network, and modifying the network model in dependence on the planning data;

recording the service in the network model, the network model storing a service instance for the service and providing accurate information on uptake of products, which is fed back for use in connection with the calculation of the resource requirement forecast;

receiving a product order specifying a product and one or more service parameters, and creating at least one service instance in the network model based on a product definition of the specified product and the specified service parameters; and retrieving service data relating to the provisioned services from the network model, and analyzing the measured network performance by reference to the retrieved service data.

\* \* \* \* \*

UNITED STATES PATENT AND TRADEMARK OFFICE
CERTIFICATE OF CORRECTION

PATENT NO.       : 8,204,981 B1
APPLICATION NO.  : 11/851314
DATED            : June 19, 2012
INVENTOR(S)      : Richard Mishra It is certified that error appears in the above-identified patent and that said Letters Patent is hereby corrected as shown below:

Claim 16, col. 16, line 28; please replace "forecast:" with --forecast;--.

Signed and Sealed this
Thirtieth Day of October, 2012

David J. Kappos
*Director of the United States Patent and Trademark Office*